W. COOPER.
Cotton-Bale Ties.
No. 153,317              Patented July 21, 1874.
FIG I
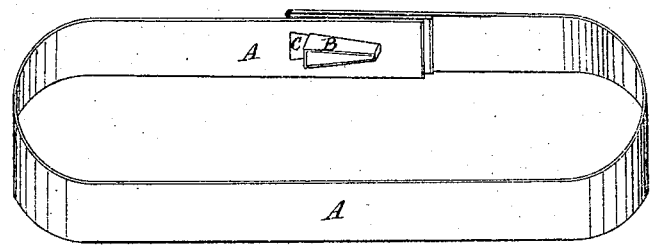
FIG IV
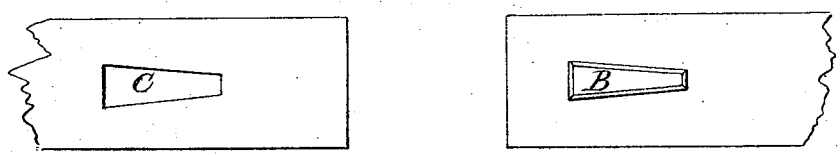
FIG II
FIG III
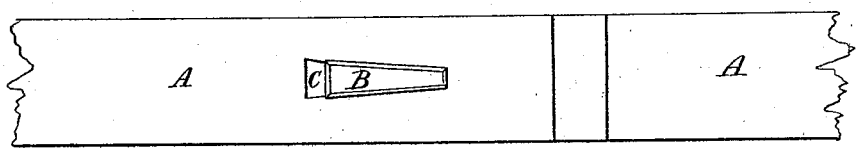
WITNESSES
Will H. Moxon
John E. Laing
INVENTOR
William Cooper
per atty
A. H. Evans & Co

UNITED STATES PATENT OFFICE.

WILLIAM COOPER, OF TYLER, TEXAS.

IMPROVEMENT IN COTTON-BALE TIES.

Specification forming part of Letters Patent No. 153,317, dated July 21, 1874; application filed July 11, 1874.

*To all whom it may concern:*

Be it known. that I, WILLIAM COOPER, of Tyler, in the State of Texas, have invented a new and useful Improvement in Cotton-Bale Ties, of which the following is a clear, full, and exact description, reference being had to the accompanying drawings making a part of this specification in which—

Figure 1 is a perspective view of a bale-tie with my improvement attached. Fig. 2 is a side view of my improved bolt. Fig. 3 is a bottom view of the same. Fig. 4 is a view of the slot in which the bolt enters, and a view of the bolt.

My invention has reference to fastening bale-ties, and consists in the shape and construction of the locking-device.

To enable others skilled in the art to make and use my invention, I will proceed to describe the exact manner in which I have carried it out.

In the drawings, A represents a bale-tie, B the bolt or locking-device, and C the slot into which the bolt B enters to fasten the tie. The bolt B is wedge-shaped, as shown in Fig. 3, and is constructed with a catch or hook at its small end, and with a groove or recess the whole length of each of its sides, of sufficient width to admit the thickness of the tie. The slot C has a shape and size corresponding to the shape and size of the bolt B, as shown in Fig. 4. It is made of sufficient size to allow the bolt to pass freely in and out in locking or unlocking the tie.

It is evident from the above description that as soon as the wedge-shape bolt passes into the slot C and strain is brought on the tie, the bolt immediately locks throughout its length, the edges of the slot passing into the grooves on the sides of the bolt B.

I am aware that bale-ties have been constructed with hooks and slots, but this I do not claim.

Having thus described my invention, what I claim as new and desire to secure by Letters Patent, is—

As a new article of manufacture a cotton-bale tie constructed as described, with the wedge-shaped bolt B and wedge-shaped slot C for locking the tie, substantially as set forth.

WILLIAM COOPER.

Witnesses:
    WILL. H. MOXON,
    JOHN E. LAING.